United States Patent
Yang et al.

(10) Patent No.: US 7,650,329 B2
(45) Date of Patent: Jan. 19, 2010

(54) METHOD AND SYSTEM FOR GENERATING A SEARCH RESULT LIST BASED ON LOCAL INFORMATION

(75) Inventors: Sang Won Yang, Seoul (KR); Chun Sik Kang, Seoul (KR)

(73) Assignee: NHN Corporation, Seoul (KR)

( * ) Notice: Subject to any disclaimer, the term of this patent is extended or adjusted under 35 U.S.C. 154(b) by 240 days.

(21) Appl. No.: 10/551,815

(22) PCT Filed: Mar. 25, 2004

(86) PCT No.: PCT/KR2004/000663

§ 371 (c)(1),
(2), (4) Date: Sep. 30, 2005

(87) PCT Pub. No.: WO2004/088540

PCT Pub. Date: Oct. 14, 2004

(65) Prior Publication Data

US 2006/0235816 A1      Oct. 19, 2006

(30) Foreign Application Priority Data

Apr. 3, 2003    (KR) .................... 10-2003-0020945

(51) Int. Cl.
*G06F 17/30* (2006.01)
(52) U.S. Cl. .................................... 707/3; 707/1; 707/2
(58) Field of Classification Search ...................... 707/3; 705/14

See application file for complete search history.

(56) References Cited

U.S. PATENT DOCUMENTS 6,735,572 B2 *  5/2004  Landesmann ................. 705/14

FOREIGN PATENT DOCUMENTS

| JP | 2000-163436 A | 6/2000 |
|----|---------------|--------|
| KR | 20020020869   | 3/2002 |
| KR | 20020046494   | 6/2002 |

* cited by examiner

*Primary Examiner*—Don Wong
*Assistant Examiner*—Sheree N Brown
(74) *Attorney, Agent, or Firm*—H.C. Park & Associates, PLC

(57) ABSTRACT

The present invention relates to a method and system for effectively providing search results by referring to local information related to a searcher in response to a search request from the searcher through a communication network. The present invention provides a method for providing local information search results, comprising the steps of maintaining local information for searching related to the searcher, relating a plurality of search items related to a network information provider to a keyword and local information related to the network information provider, receiving a search request from the searcher, identifying at least more than one search item related to the keyword that meets the search request and selecting a search item related to local information matched to the local information for searching among the identified search items, and arranging at least a part of the search items according to a predetermined search item arranging method in arranging the selected search items. According to the present invention, as it is possible to provide search results with reference to the local information related to a searcher when providing search results to the searcher, more useful local information can be provided to the searcher.

22 Claims, 10 Drawing Sheets

FIG. 2b

Naver home > Local living Information > Health, Medical Care

Health, Medical Care

Local category nursing@ (301)  obstetrics@ (2050)  otorhinolaryngology@ (1244)

diet@ (912)  neurosurgery@ (332)  Dental clinic@ (9387)

anesthesiology@ (51)  Pharmacy@ (15025)  Health club@ (3676)

METHOD AND SYSTEM FOR GENERATING A SEARCH RESULT LIST BASED ON LOCAL INFORMATION

TECHNICAL FIELD

The present invention relates to a method and system for effectively providing search results by referring to local information related to a searcher in response to a search request from the searcher through a communication network, and more particularly to a method and system for selecting and effectively arranging search items related to search information for searching of the searcher, in providing Internet search results in response to a keyword input by the searcher.

BACKGROUND ART

Today, with rapid development of communication networks such as Internet, information searching through the communication network is very widely used. FIG. 1 shows a general network structure for providing a search result screen according to a search result of a searcher. A searcher can access to a search engine server 140 through communication networks such as Internet 130, using terminals 110 and 120 such as a PC (Personal Computer), and obtain search results in response to a keyword, by inputting the keyword. In the meantime, a network information provider is an enterprise or an individual for providing information wanted by a searcher, and accesses to the Internet through network information provider web servers 160 and 170. A search database 150 stores a plurality of search items regarding the network information provider, and each of the search items includes a title of a website, an URL (Uniform Resource Locator), which is a network address of a website, description of a website, and a keyword. In case a keyword requested by a searcher is in agreement with a keyword included in the search item, the search engine server 140 provides the relevant search item to a searcher for search results. For representative search engine servers widely used toady, there exists a naver (http://www.naver.com).

As the Internet has a close relation with the whole of our everyday lives, it has now become frequent that we search local living information related to the region where we lives, through the Internet. But, website information provided to a searcher through the Internet is so massive that it has become very difficult for a searcher to determine how to find out the website where information really wanted by a searcher is stored, among the search results.

For example, suppose a case that a searcher who lives in "Samsung-dong, Gangnam-gu, Seoul" inputs a keyword "dental clinic" to search a dental hospital in an Internet search engine in order to receive dental service. In that case, according to the prior art, since not knowing local information regarding the searcher, the Internet search engine server only provides search results in which local information of the searcher is not reflected, to the searcher. Namely, for the search results provided to the searcher, not only the dental clinics located in "Gangnam-gu, Seoul", but also the dental clinics located in Busan or even in Jeju-do are provided as the search results. Further, since local information of the searcher is not reflected at all in the search results, a search item for the dental clinic located, far distant from the location of the searcher might be arranged as top-ranking search results, while a search item for the dental clinic located close to the location of the searcher might be arranged as low-ranking search results.

Also, suppose that the searcher inputs a keyword "dental clinic <AND> Gangnam-gu" into an input command window of the Internet search engine to find out a dental clinic located in the neighborhood of the searcher' home. Then, on the search result screen provided to the searcher, a plurality of search items related to the keywords "dental clinic" and "Gangnam-gu" are displayed. Among the search items, there exist search items regarding the dental clinics really located in Gangnam-gu, but a plurality of search items regarding the dental clinics that have nothing to do with the Gangnam-gu might be displayed due to limitation of the keyword search method. Also, even in case of the dental clinics really located in Gangnam-gu, if the dental clinic does not include information "Gangnam-gu" at its web page, such dental clinic might not be searched through the Internet searching.

Therefore, there exists inconvenience that a searcher should refer to and check the search items case by case, by making a considerable effort to find out information about the region desired by a searcher.

To improve such inconvenience, lots of methods for effectively searching and arranging a plurality of items so that a searcher may search, in the easier and faster manner, information about the region desired by a searcher, have been suggested.

FIGS. 2A, 2B, 2C and 2D show one example of a method for searching, by a searcher, local living information related to the searcher's region using an Internet search engine server. Here, FIG. 2A shows an example of a category list related to local living information provided to a searcher. As shown in FIG. 2A, a method for classifying, according to its category, the websites that are meaningful to a searcher, as local information and displaying the same, is used in the naver search engine server of NHN corporation.

If a searcher clicks the desired category by referring to a category's title among the category lists of FIG. 2A, the more detailed sub-category list which belongs to the above category is displayed on the next screen. FIG. 2B shows one example of the sub-category list provided to a searcher in case the category "health, medical care" is referred among the top-ranking category list of FIG. 2A. If a searcher selects a sub-category "dental clinic" at this time among the sub-category list of FIG. 2B, a massive amount of website search results related to the "dental clinic" is provided to a searcher as shown in FIG. 2C, in which the website search results related to the dental clinics scattered all over the country are arranged.

According to the prior art, to get a searcher to be able to search desired local information among the website search results, a method wherein a searcher inputs desired local information for searching, on the screen of FIG. 2C using a format of -si, -gu and the only website information related to the local information for searching is selected, classified, and provided as local information search results, has been suggested up to now. FIG. 2D shows one example of a screen of local information search results provided when "Seoul-si", "Gangnam-gu" are input for local information in FIG. 2C.

Namely, according to the prior art, to get a user to carry out Internet information search related to a predetermined local information, a method wherein a user selects a category (for example, real estate, hospital, etc.) to which information to be searched belongs, and then delivers local information to the Internet search engine, has been used.

But, in the method for providing local information search results according to the foregoing prior art, there exists inconvenience that a searcher should search local information by passing through a plurality of steps and a searcher should input desired local information for searching together with a keyword. Therefore, for a searcher who intends to repeat information searching with different keywords regarding the same region, or to search local information whenever necessary, there exists inconvenience that a searcher should designate a region for searching every time upon searching.

DISCLOSURE OF INVENTION

It is, therefore, an object of the present invention to provide more useful information to a searcher by providing search results with reference to local information related to the searcher when providing Internet search results to the searcher.

It is another object of the present invention to get the searcher to easily search information related to local information without inputting local information whenever the searcher searches information related to local information.

It is still another object of the present invention to get the searcher to search information regarding a region related to a region of interest in an easier and faster manner.

It is further still another object of the present invention to provide local information searching related to a keyword, to the searcher through a variety of search item arranging methods.

It is another object of the present invention to effectively provide local advertising effect to a network information provider through local information search results.

It is still another object of the present invention to provide customized local information that is fit for local characteristics of the searcher.

It is further still another object of the present invention to provide advertisement opportunity through local information search results, even to a network information provider of the region where there is no website.

To achieve the foregoing objects and to resolve the problems of the prior art, there is provided a method and system for generating a search result list based on local information to provide search results related to local information for searching by referring to local information for searching designated in advance by a searcher, in response to a search request through a communication network.

According to aspect of the present invention, there is provided a method for providing local information search results in response to a search request input through a communication network by a searcher, the method comprising the steps of: maintaining local information for searching related to the searcher, maintaining a database including a plurality of search items related to a network information provider, in which the search items are related to a keyword and local information related to the network information provider, receiving a search request from the searcher, identifying at least more than one search item related to the keyword that meets the search request and selecting a search item related to local information matched to the local information for searching, among the identified search items, and arranging at least a part of the search items according to a predetermined search item arranging method in arranging the selected search items.

According to aspect of the present invention, there is provided a method for providing local information search results in response to a search request input through a communication network by a searcher, the method comprising the steps of: receiving local information for searching from the searcher and storing the received local information for searching, receiving a request for a local advertisement related to local information, from a network information provider, maintaining a plurality of search items related to a keyword, in which the search items are related to the local information and the network information provider in response to the request for the local advertisement, receiving a search request from the searcher, identifying at least more than one search item related to the keyword that meets the search request and selecting a search item related to local information matched to the local information for searching and the network information provider, among the identified search items, and arranging at least a part of the search items according to a predetermined search item arranging method in arranging the selected search items.

According to another aspect of the present invention, there is provided a method for providing local information search results in response to a search request input through a communication network by a searcher, the method comprising the steps of: receiving local information for searching from the searcher and storing the received local information for searching, maintaining a database including a plurality of search items related to a network information provider, in which a predetermined local keyword is selected among keywords and the search items are related to the local keyword and the local information related to the network information provider, receiving a search request from the searcher, if the keyword that meets the search request is the local keyword, identifying search items related to the local keyword and selecting a search item related to local information matched to the local information for searching, among the identified search items, and arranging at least a part of the search items according to a predetermined search item arranging method in arranging the selected search items.

According to another aspect of the present invention, there is provided a system for providing local information search results in response to a search request input through a communication network by a searcher, the system comprising: a local information processing part for receiving local information for searching from the searcher and storing the same, a search request receiving part for receiving a search request from the searcher, a storing part for storing a plurality of search items related to a network information provider and relating the search items to a keyword and local information related to the network information provider, a search performing part for identifying search items related to a keyword that meets the search request and selecting a search item related to local information that meets the stored local information for searching, among the identified search items, in response to the search request, and a search results providing part for arranging the selected search items according to a predetermined search item arranging method.

BRIEF DESCRIPTION OF DRAWINGS

FIGS. 2A, 2B, 2C and 2D show one example of a method for searching, by a searcher, local living information related to the searcher's region using an Internet search engine server.

BEST MODE FOR CARRYING OUT THE INVENTION

A preferred embodiment of a method and system for providing local information search results will now be described in detail with reference to the accompanying drawings in the following.

Figure 1:
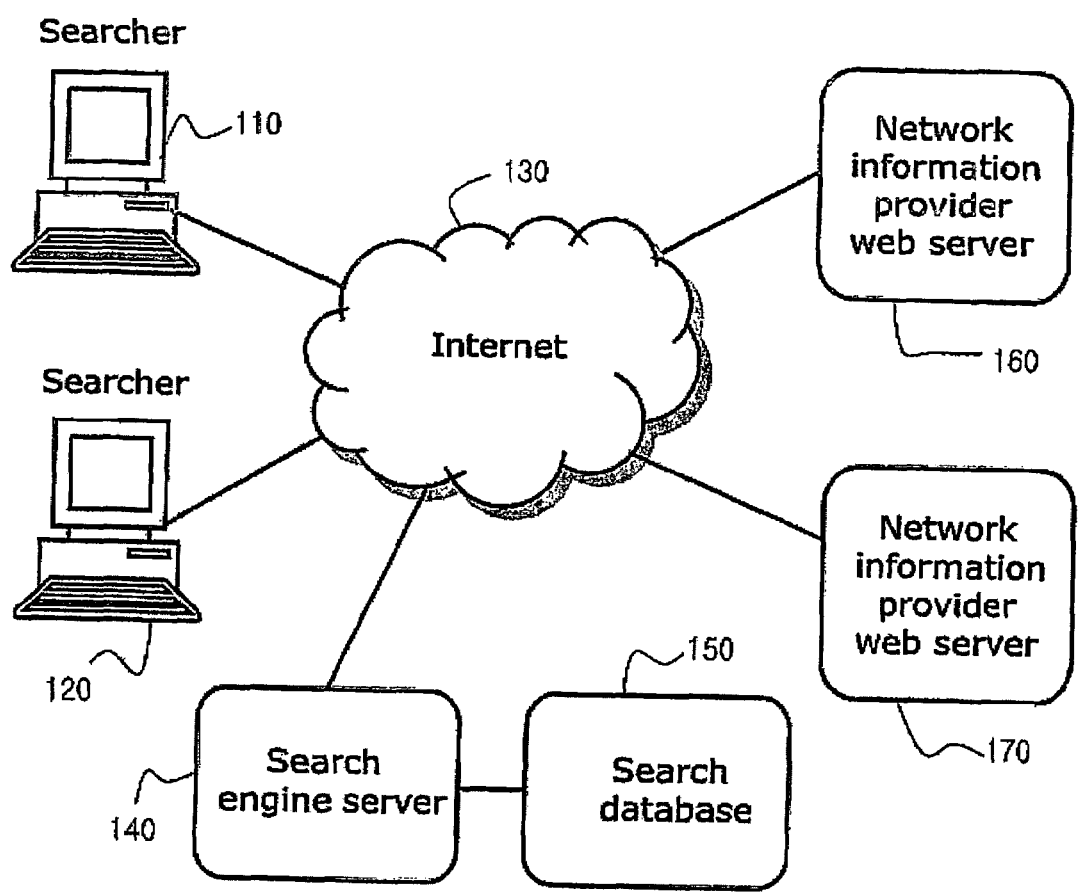
FIG. 1 shows a general network structure for providing a search result screen according to a search result of a searcher.
Figure 2A:
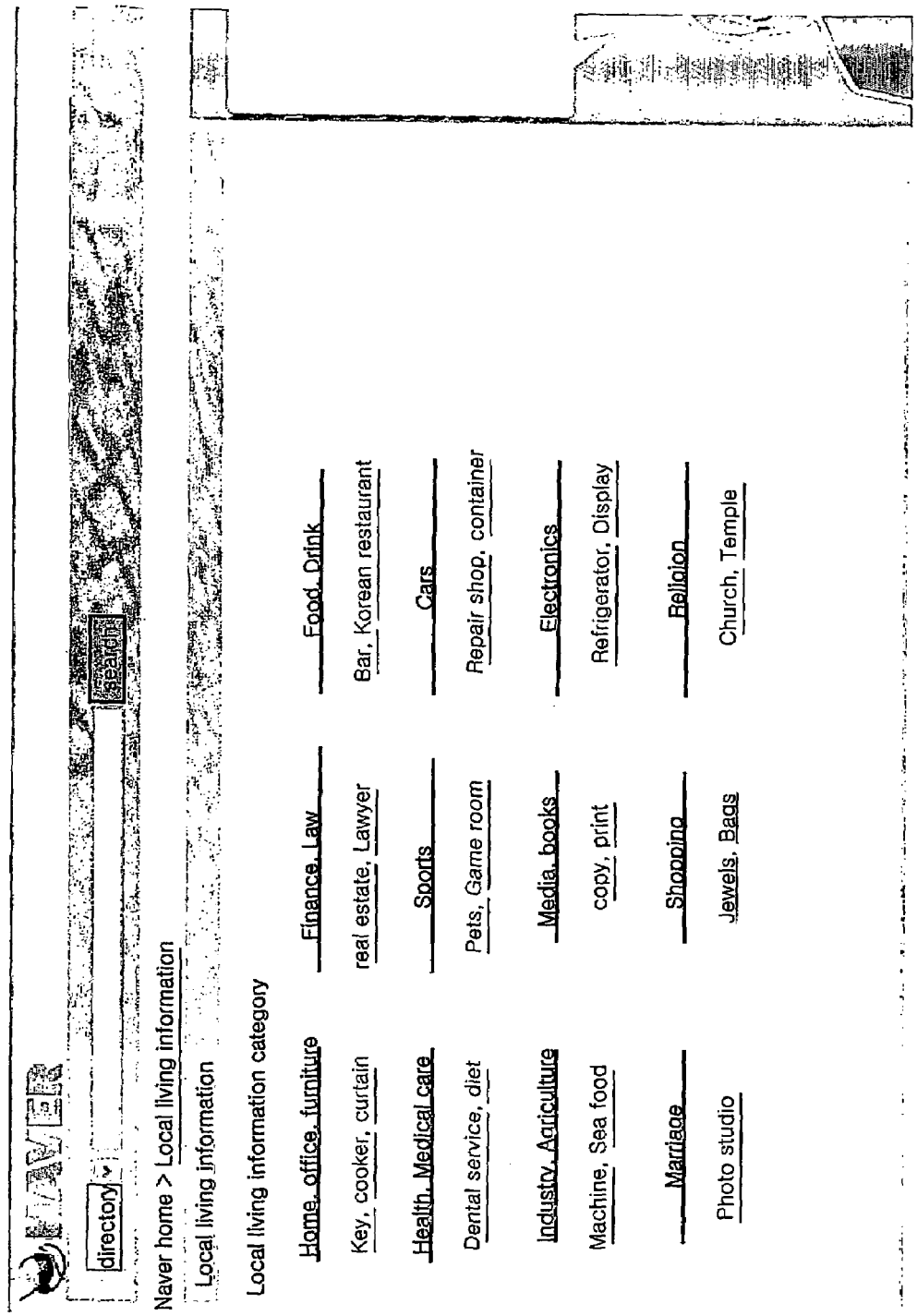
Figure 2C:
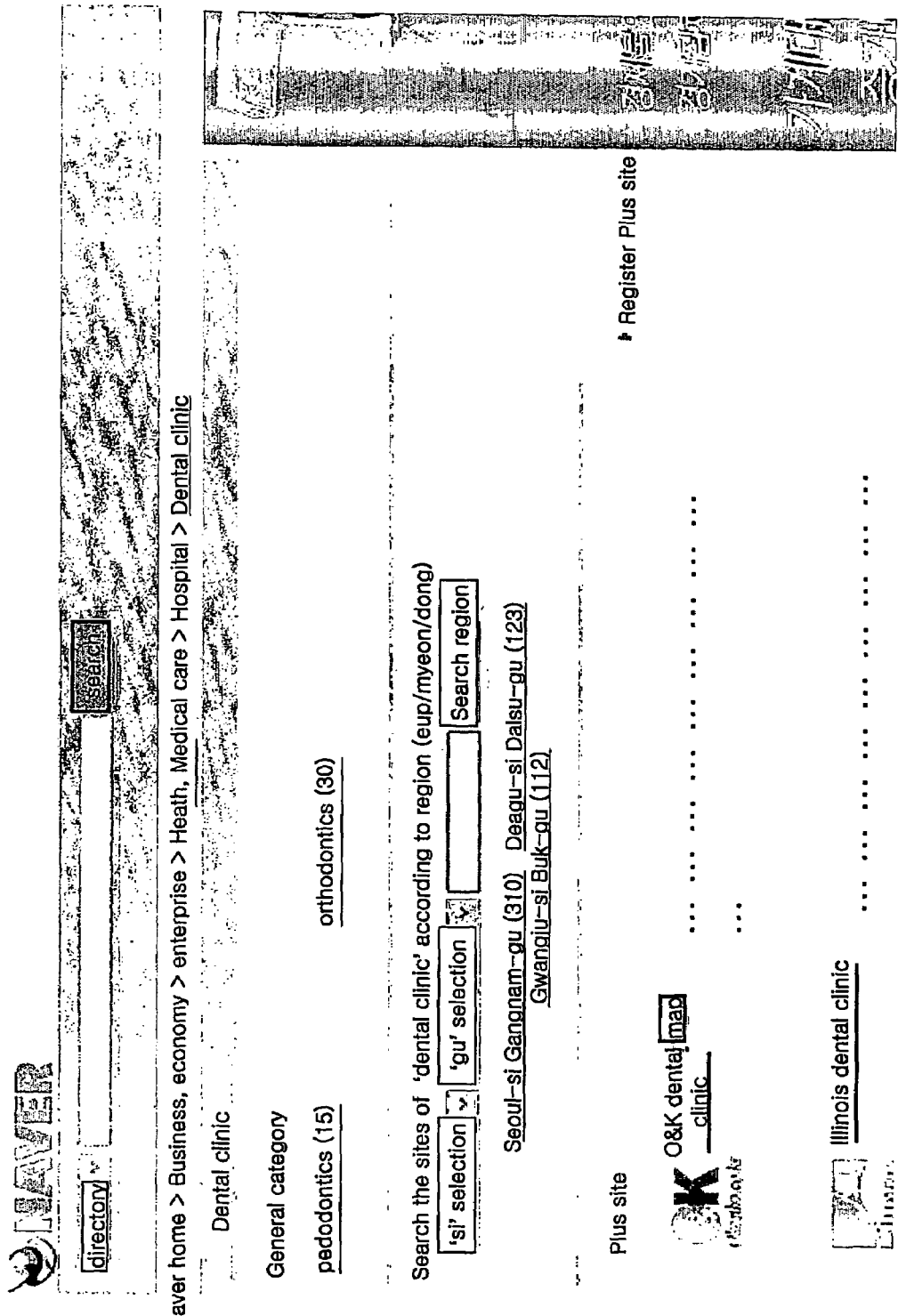
Figure 2D:
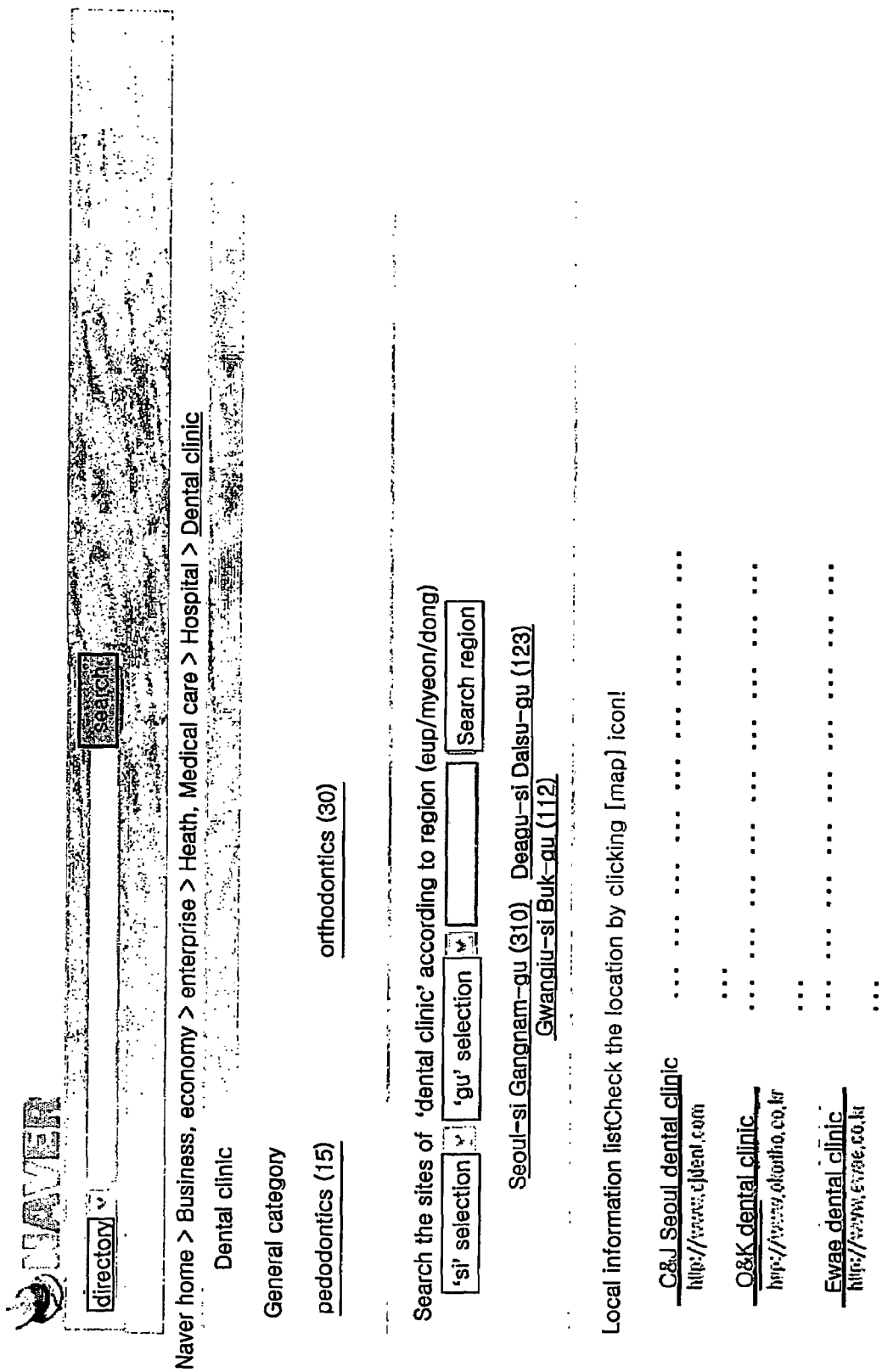
Figure 3A:
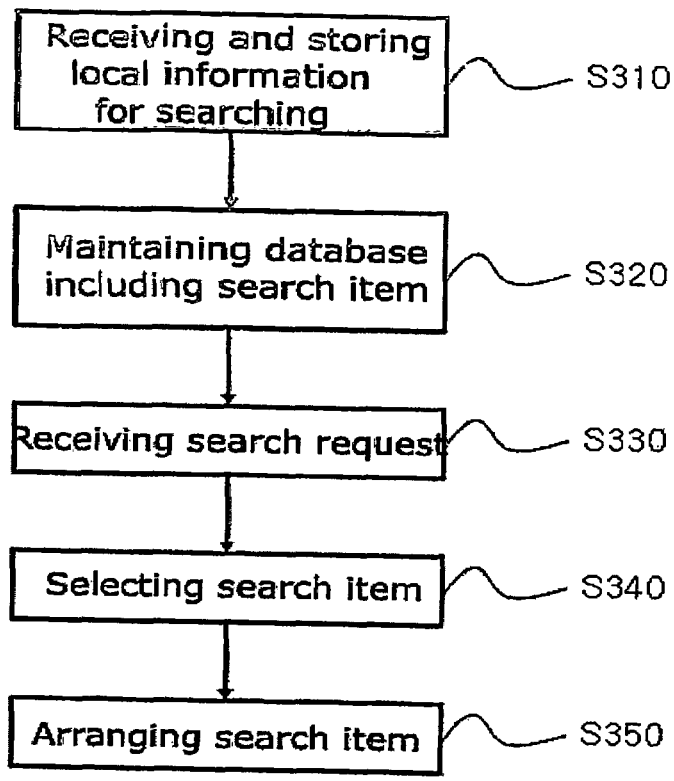
FIGS. 3A and 3B are flowcharts representing a process in which if a searcher accesses to the Internet search engine server and inputs a search request, Internet search results are provided to the searcher with reference to local information related to the searcher according to the present invention.
Figure 3B:
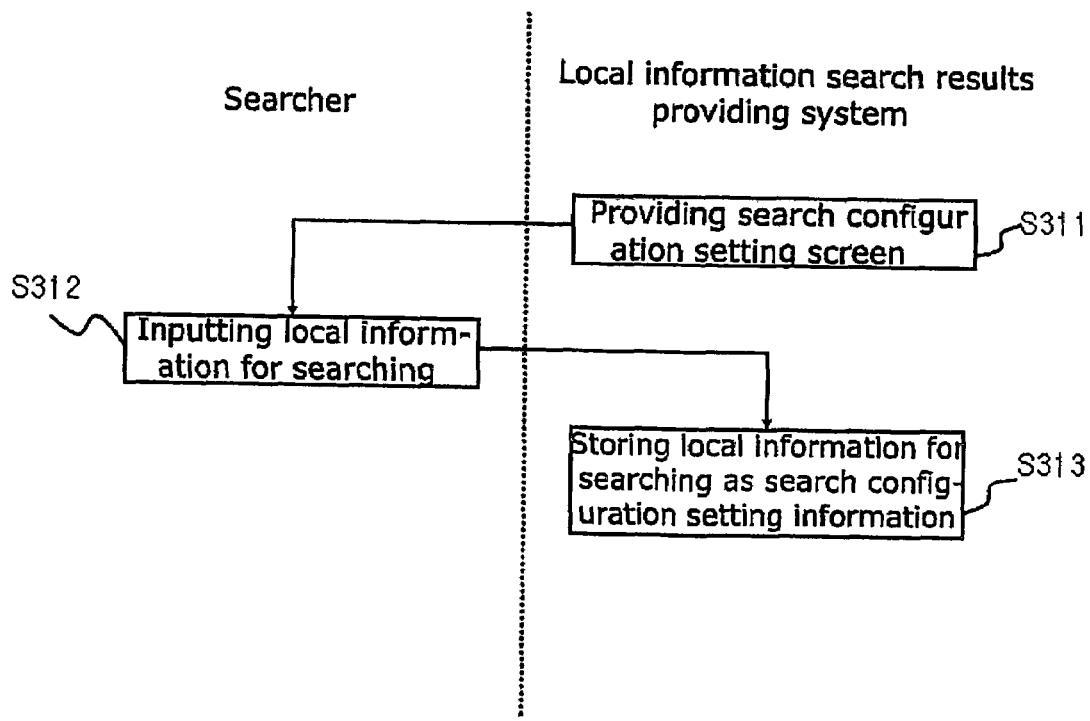

FIGS. 3A and 3B are flowcharts representing a process in which if a searcher accesses to the Internet search engine server and inputs a search request, Internet search results are provided to the searcher with reference to local information related to the searcher according to the present invention.

On the first place, at the step of S310, local information for searching is received from a searcher and the received local information for searching is stored.

According to the present invention, a searcher does not input local information of his interest for searching every time upon searching, but input only one time, initially, the local information for searching. Then the input local information is stored by a local information search results providing system and maintained as the local information for searching related to the searcher. Therefore, even in case the searcher accesses to the local information search results providing system to input a keyword without the local information for searching next time, the local information search results providing system provides a variety of local information search service to the searcher by automatically referring to the stored local information for searching.

FIG. 3B explains in detail a method for receiving and storing the local information for searching from the searcher at the step of S310. In the following, a method for receiving and storing local information for searching from the searcher will be described with reference to FIGS. 3B, 4, and 5, and, subsequently, the step of S320 will be described.

At the step of S311, the local information search results providing system provides, to the searcher, a search configuration setting screen in which a searcher can set a variety of search configurations for search results.

Figure 4:
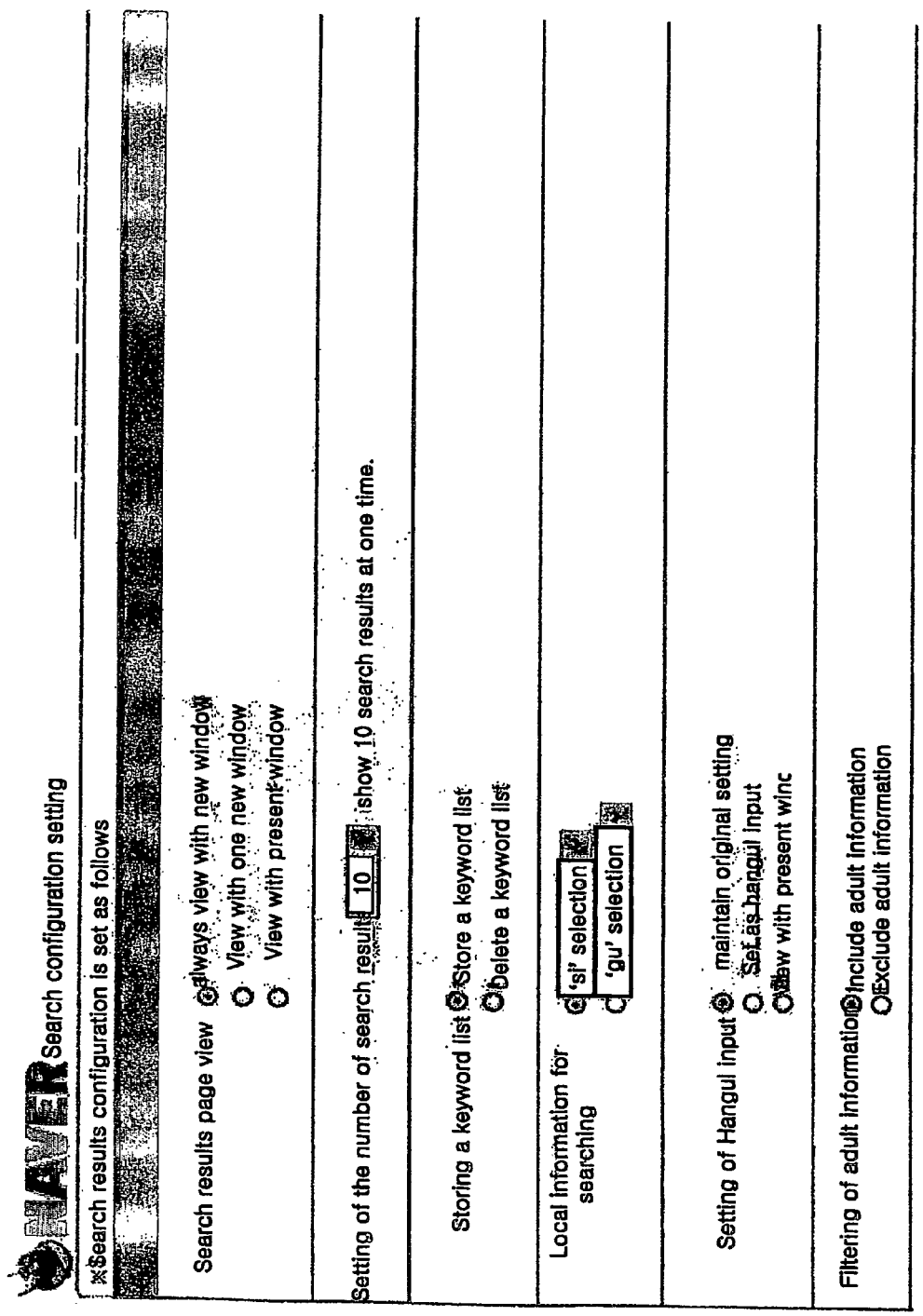
FIG. 4 shows an example of a search configuration setting screen to receive and store the local information for searching from the searcher.

An example of the search configuration setting screen is shown in FIG. 4.

As shown in FIG. 4, a searcher sets search configuration for a search results page displaying method, a number of search results to be displayed, whether to store a keyword list, local information for searching, Hangul (Korean alphabet) input setting method, and filtering of adult information, which are required when the searcher performs searching, using a search engine.

As shown in FIG. 4, the search configuration setting information includes local information for searching, and at the step of S320, a searcher inputs local information for searching and transmitting the same to the local information search results providing system. At the step of S313, the local information search results providing system stores the local information for searching received from the searcher, at a searcher's terminal in form of cookie file.

Figure 5:
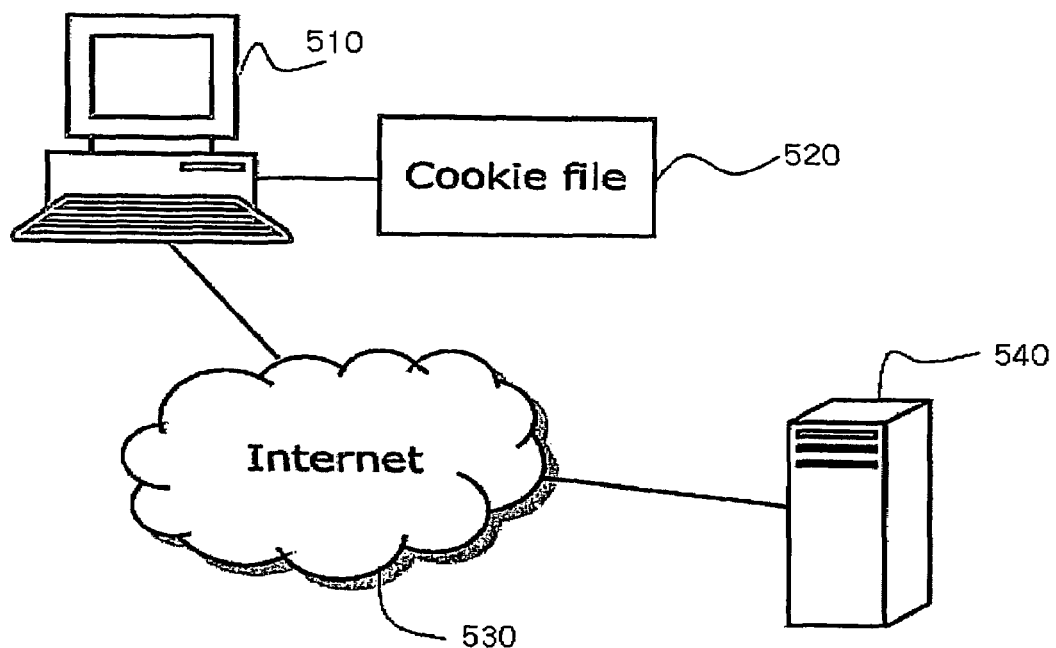
FIG. 5 shows an example of storing the local information for searching at a searcher's terminal in form of cookie file.

FIG. 5 shows a structural view of a network explaining a method for storing, by the local information search results providing system, the local information for searching received from the searcher, at the searcher's terminal in form of a cookie file. The searcher accesses to the local information search results providing system 540 through the searcher's terminal 510 connected to the Internet 530.

The cookie file 520 is a special text file stored at a hard disk of the terminal 510, which is a client terminal, by the local information search results providing system or other website in case a searcher accesses to the local information search results providing system 540 or other website through the terminal 510. In a HTTP (Hyper Text Transfer Protocol) protocol used for access to the websites, each request for the website is all independent of the other requests. Therefore, the local information search results providing system cannot have any information whatsoever as to which page it has transmitted previously to the terminal 510 of the searcher or which page it has performed together with the terminal 510. Accordingly, the cookie file is provided to get each request that is independently processed in this manner to be related each other, and such cookie file plays a role of getting the local information search results providing system 540 to store information regarding the searcher at the searcher's terminal. Of course, the cookie file can be used for detecting local information for searching related to the searcher.

By storing local information for searching at the searcher's terminal in form of a cookie file in this manner, even in case the searcher makes a search request in the same manner as the general Internet searching, the Internet search engine can provide more useful information to the searcher by referring to the local information for searching stored in the cookie file of the searcher's terminal. Namely, according to the present embodiment, since additional procedures such as "log in" is not required, local information that is both transparent and useful to the searcher can be provided.

For another embodiment of the present invention, it may be possible to perform search configuration setting including the local information for searching after a searcher logs in the local information search results providing system. Since the searcher inputs local information for searching related to the searcher after logging in the local information search results providing system, the local information search results providing system can know information about the searcher and store the local information at a predetermined database in relation with the searcher's information. Also, if the searcher carries out searching after logging in the local information search results providing system, the local information search results providing system can identify the searcher through the log-in procedure, and obtain the local information for searching stored as search configuration setting information of the identified searcher, so that, the local information search results providing system can reflect the local information for searching when providing the search results to the searcher.

Though the local information for searching can be reflected only in case the searcher makes a search request after the log-in procedure according to the present embodiment, it is also possible to reflect the local information upon providing the search results even in case the searcher makes a search request using other PC (for example, in case the searcher uses a PC in a PC room) as far as the searcher sets the local information for searching only one time.

For still another embodiment for storing search information according to the present invention, there exists a method wherein a predetermined client program is installed in the searcher's terminal and the client program sets the region of interest with respect to local information for searching. If the searcher accesses to the local information search results providing system through the searcher's terminal to perform searching, the client program provides the local information of the searcher to the search engine server, so that the search engine server can obtain the local information for searching.

Although the foregoing three embodiments of the present invention are limited to the case of receiving the local information of the searcher from the searcher, it may be also possible to extract the local information of the searcher from other information of the searcher and store the same in the local information search results providing system, a cookie file of the searcher's terminal, or a file related to the client program installed in the searcher's terminal in case the searcher does not explicitly input the local information of the searcher.

In the above, the local information input by the searcher is the information regarding the region that is wanted to be considered by the search engine server upon searching afterward by the searcher. For example, office workers who spend most of time at a company may input local information of the company for the local information, while housewives who spend most of time at home may input local information of home for the local information.

For example, in case the searcher inputs his telephone number (not shown in FIG. 4) on the search configuration setting screen, it is possible to extract the local information of the searcher on the basis of the telephone number and store the same. As a telephone exchange number is determined according to regions, if a database that includes local information according to the telephone exchange numbers is provided, the telephone exchange number input by the searcher is compared with the above database, so that the local information for the searcher can be obtained.

Similarly, it may be possible to extract the local information on the basis of the company's name input by the searcher. For example, if a database regarding address for each company is provided, it is possible to extract the local information of the searcher on the basis of the company's name input by the searcher. According to the present embodiment, even if the searcher does not explicitly input the local information, it is possible to provide, to the searcher, the search results reflecting the local information that is related to the searcher.

In the following, the step of S320 and the subsequent steps will be described.

The step of S320 maintains a database including a plurality of search items related to the network information provider. At the present step, the website of the network information provider is related to the search item.

Figure 6:
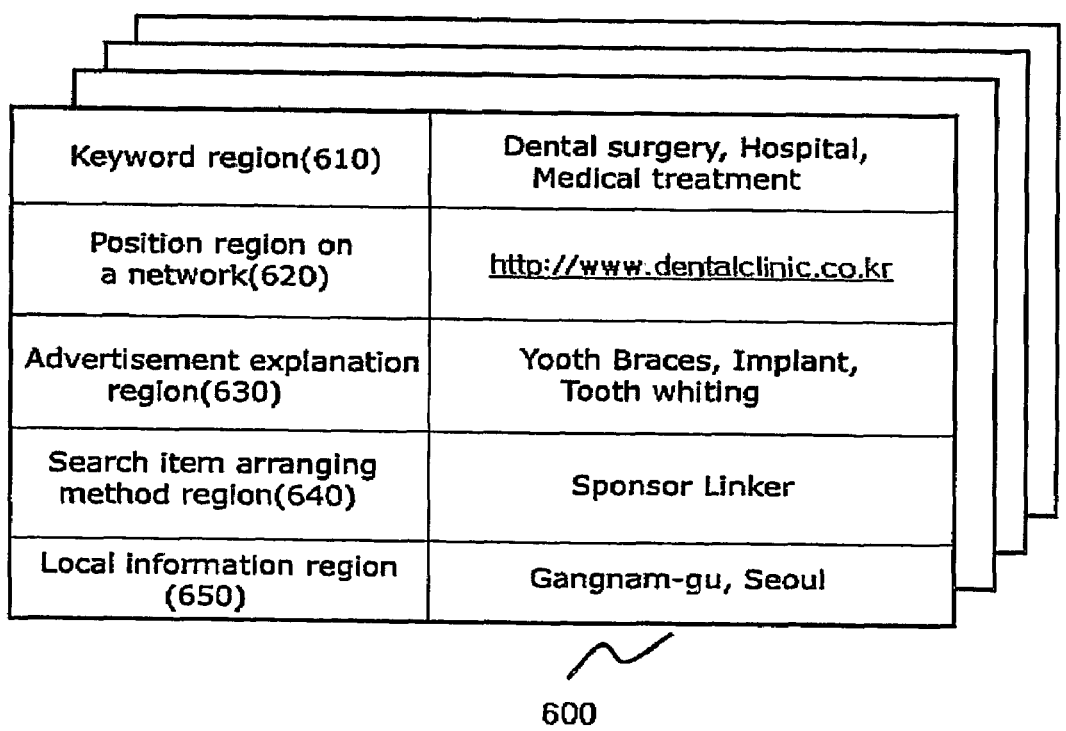
FIG. 6 shows one example of construction of the search items according to the present invention.

FIG. 6 shows one example of construction of the search items according to the present invention, and each search item 600 includes: a keyword region 610; a position region on a network 620; an advertisement explanation region 630; and a search item arranging method region 640; a local information region 650. The keyword region 610 includes the keywords as an identifier for identifying a specific search item from a plurality of search items, and includes one or a plurality of keywords. The position region on a network 620 includes an URL related to the network information provider, so that the URL is provided to a browser program of the searcher when the searcher clicks on a hyper link provided in the search item. The advertisement explanation region 630, which a brief explanation of the website's content of the network information provider, may be displayed on a screen as a part of the advertisement in the search item. The search item arranging method region 640 is designed to designate a predetermined method for displaying the search item. According to the preferred embodiment of the present invention, the search item arranging method may be one among a keyword banner, knowledge search results, a sponsor link, a category, a plus site currently provided by NHN corporation.

The local information region 650 includes local information related to a website of the network information provider related to the search item. If the local information for searching designated by the searcher is in agreement with the local information within the search item, the search item including such local information is identified as a relevant search item that meets a search request by the searcher.

For an embodiment for designating the local information, the network information provider can input the local information related to the website of its own when registering the website at a storing part of the local information search results providing system, and the local information search results providing system can store the input local information at the local information region of the search item.

For another embodiment, even though the local information is not explicitly received from the network information provider, the local information search results providing system may possibly extract the appropriate local information by referring to content of the website of the network information provider, and store the same at the local information region of the search item. For example, if the network information provider is a "dental clinic" and the position information of the clinic is described in website of the dental clinic, the local information search results providing system may automatically extract the position information and store the same at the local information region. Unlike the above example, if the network information provider inputs information related to the region such as a telephone number, a trade name, an address, and the input information is stored in the local information search results providing system, it may be also possible to extract the local information of the network information provider on the basis of that information. For example, since a telephone exchange number of a telephone number is determined according to regions, if a database that includes local information according to the telephone exchange number is provided, the telephone exchange number input by the network information provider is compared with the above database, so that the local information of the network information provider can be obtained.

According to still another embodiment of the present invention, at the step of S320, a predetermined keyword where region is meaningful is selected in advance as a "local keyword". For example, since the keywords such as "psychology", "HTML" are not related very much to the local information while the keywords such as "kindergarten", "real estate", "hospital", and "auto maintenance" are possibly considered to be highly related to the local information, such keywords are selected in advance as the local keywords and stored in a predetermined database. Therefore, if the searcher inputs a keyword "psychology", the search results that reflect the local information of the searcher are not provided to the searcher, but if the searcher inputs a local keyword "hospital", the search results can be provided, to the searcher, in an order of the same region as the searcher, and the neighboring region of the searcher, by reflecting the local information of the searcher.

According to an embodiment of the present invention, the local keyword can be determined differently region by region with consideration of local characteristics. For example, in case of Ganggyeong, Jeollanam-do well known as a producing center of its salted sauce, the "salted sauce" may be a meaningful local keyword for the "Ganggyeong" province, but in case of other provinces, it may not be pertinent that the keyword "salted sauce" is selected as a local keyword. In case of "Ganggyeong" province, since there are lots of enterprises related to the "salted sauce", users in "Ganggyeong" province frequently perform searching using the keyword "salted sauce", therefore, it is necessary to subdivide the region and provide, to the searcher, the search results reflecting the local information of the searcher. But, in case of other province, such necessity may be low. Accordingly, it is more preferable to differently select the local keyword considering the local characteristics region by region.

At the step of S330, the local information search results providing system receives a search request from the searcher. If the searcher accesses to the local information search results providing system to input a keyword or information related to the keyword, the keyword is delivered as a search request packet to the local information search results providing system.

At the step of S340, the local information search results providing system identifies at least more than one search item related to the keyword that meets the search request in response to the search request from the searcher. When searching the search item that is in agreement with the keyword received from the searcher, the local information search results providing system refers to the local information of the searcher stored in the step of S310. Namely, in case the local information for searching is stored in the cookie file, the local information search results providing system refers to the cookie file, and in case of the embodiment based on the log-in system, the local information search results providing system refers to the local information for searching stored in it in relation to the searcher. In the meantime, in case the client program is installed in the searcher's terminal, the client program simultaneously provides the local information for searching when providing the search request to the local information search results providing system.

For still another embodiment, in case the step of S320 selects a predetermined keyword where region is meaningful as the local keyword and connects the local keyword to the search item, the step of S340 judges whether the keyword that meets the search request from the searcher is the local keyword, and if the keyword is judged to be the local keyword as a result of judgment, the step of S340 can identify the search item related to the local keyword. Namely, if the keyword input by the searcher is not the local keyword, the search results are provided in the same way as the prior art, and if the keyword is the local keyword, the search results are provided with reference to the local information of the searcher.

The local information search results providing system selects the search item related to the local information that meets the local information for searching stored at the step of S340, among the identified search items. For a preferred embodiment, the "local information that meets the local information for searching" may include not only the local information that is in agreement with the local information for searching but also the local information closely related to the region to be searched as well. Namely, in case the local information for searching is "Gangnam-gu, Seoul", the searching items that are related to not only "Gangnam-gu, Seoul" but also "Seocho-gu, Seoul" which is its neighboring region, may be selected together. Also, for example, in case there is no search item that is related to the local information "Gangnam-gu, Seoul" with respect to a specific keyword, the search item that is related to the local information "Seocho-gu, Seoul" which is the neighboring region of "Gangnam-gu, Seoul", may be displayed. Also, "closely related local information" may include not only the local information regarding the neighboring region geographically but also the local information closely related due to other reasons such as cultural, social, or environmental reasons.

The step of S350 which arranges the search items selected at the step of S340, arranges the search items according to a predetermined search item arranging method. According to the present invention, it is possible to arrange the selected search items according to a variety of arranging methods. If a search request is received from the searcher, the search results are provided to the searcher on the basis of the local information for searching related to the searcher. If a keyword "dental clinic" is input by the searcher and the local information for searching related to the searcher is "Gangnam-gu, Seoul", the search items whose local information is "Gangnam-gu, Seoul" are displayed at the upper part on the screen and the "dental clinic"-related search items related to the rest regions are displayed at its lower part, among the found search items.

According to further still another embodiment of the present invention, after the search items having the local information that is in agreement with the "Gangnam-gu, Seoul" are displayed, the "dental clinic" information related to the neighboring region (for example, Seocho-gu, Seoul) of the "Gangnam-gu, Seoul", is subsequently displayed. Therefore, according to the present embodiment, even if the searcher does not separately input the local information when making a search request at the Internet search engine server (namely, even if the searcher inputs simply the "dental clinic"), the search results where the local information of the searcher is reflected can be obtained.

According to an embodiment of the present invention, in response to a search request from the searcher, the search item that is highly appraised by users or the web page of the network information provider who has paid much for its advertisement charge will be preferentially arranged and provided to the searcher, among the search items that are in agreement with the local information.

Figure 7:
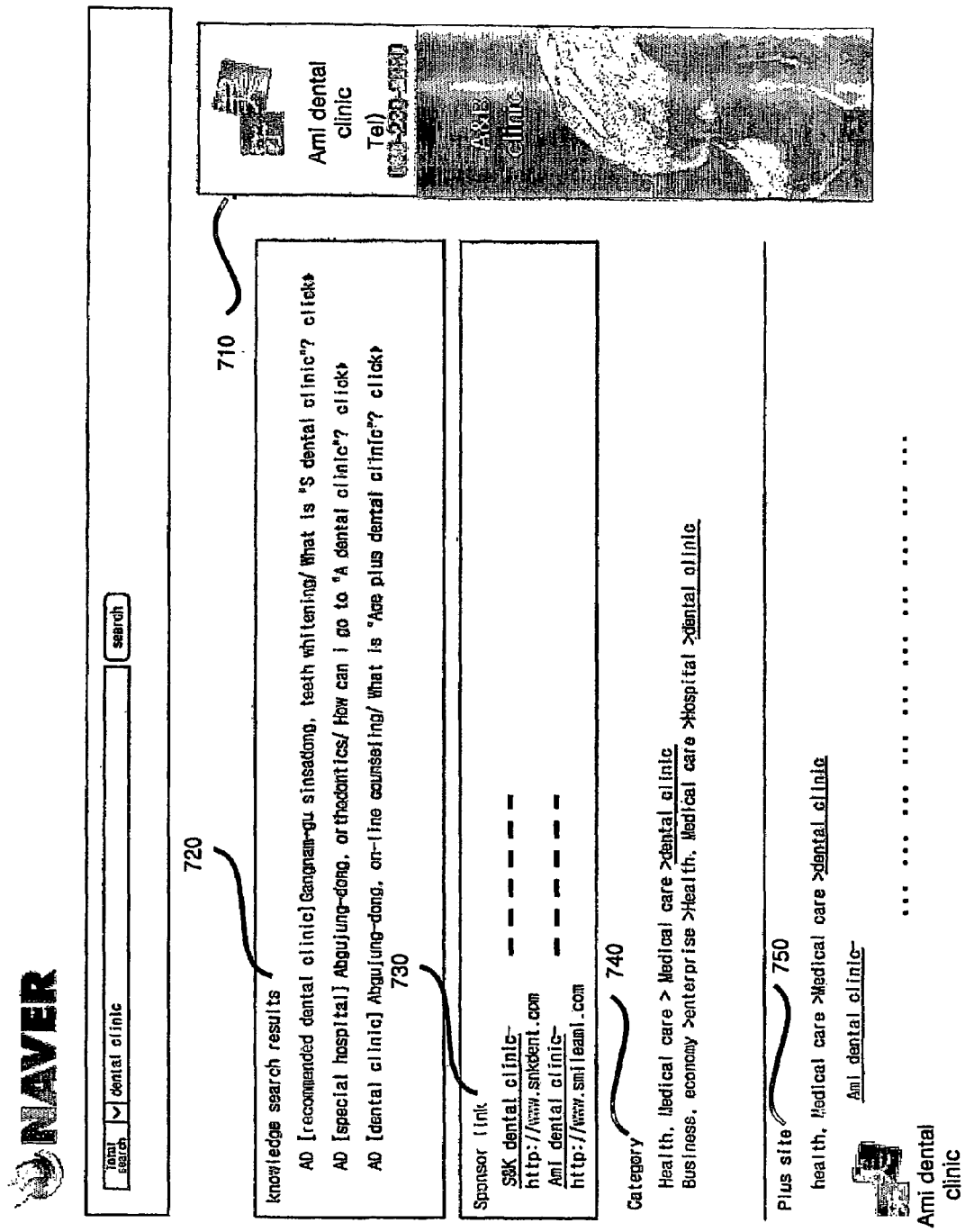
FIG. 7 shows one example explaining a method for arranging the search items according to a preferred embodiment of the present invention.

FIG. 7 shows one example explaining a method for arranging the search items according to a preferred embodiment of the present invention. As shown in FIG. 7, for the arranging method, there exist a keyword banner 710, knowledge search results 720, a sponsor link 730, a category 740, and a plus site 750.

The arranging method of the "keyword banner 710" is to display the search items in form of a banner having a predetermined size manufactured with a flash animation or an image, at the first page where the search items of a specific keyword are displayed as shown in the right side of FIG. 7. In the arranging method of the "keyword banner 710", advertising effects may be enhanced by monopolistically inserting a banner of only one single enterprise or several enterprises.

The arranging method of the "knowledge search results 720" is to represent, in form of questions, the website and the characteristics of the network information provider. In this arranging method, the keyword and the question itself can be linked to the website of the relevant enterprise and the search items are positioned at the uppermost part of an integrated search results and an advertisement region is provided up to a predetermined ranking for each keyword.

The arranging method of the "sponsor link 730" is to display a title and a description of the website at the first page of the specific keyword search results. In this arranging method, the search items are positioned at the uppermost part of the integrated search results and the directory search results, and the advertisement region is provided up to a predetermined ranking for each keyword.

The arranging method of the "category 740" is to classify the search items into a plurality of categories depending on content of the web page related to the search item and display a list of the search categories, in displaying numerous search items related to the keyword. For example, if the keyword "dental clinic" is input, the information of the relevant region is displayed in form of a category such as "dental surgery", "dental clinic", "dental hospital", and the like.

The arranging method of the "plus site 750" is to show additional information and an image of the web page together with the search results. In this arranging method, publicity content directly described by the network information provider is introduced and the registration process is swiftly processed, whereby easy and fast registration service is provided.

For a preferred embodiment, it is possible to get the network information provider of the web page related to the search item, to select the search item arranging method and arrange the search item according to the selected arranging method.

For another embodiment of the local information search results providing system shown in FIG. 3A, the step of receiving, from the network information provider, a local advertisement request related to the local information, may be additionally included. Namely, for predetermined local information, a local advertisement request is received from the network information provider, and the search items are related to the network information provider who has made the local advertisement request. Also, the website of the network information provider who has made the local advertisement request is selected and arranged in the local information search results, whereby the website of the network information provider is advertised on the basis of the local living information, which can enhance the advertising effect of the network information provider even more.

For the method for arranging the selected search items, one among the above described keyword banner, the knowledge search results, the sponsor link, the category, and the plus site, may be used.

The present embodiment which includes the local advertisement, additionally includes the step of determining a predetermined advertisement charge for the local advertisement, and the advertisement charge may be determined differently depending on the local information related to the local advertisement request. For example, in case of the keyword "plastic surgery", since it is expected that search frequency for the local information of "Gangnam-gu" where the plastic hospitals are concentrated much more, is much greater than the search frequency for other city or other-gu, the advertisement charge may be determined with consideration of the advertisement effect for each region. For another embodiment, the advertisement charge may be determined depending on a size of the region related to the local advertisement. For example, the advertisement charge may be differently estimated depending on whether it is a local advertisement for -gu or it is a local advertisement for -dong. For still another embodiment of the present invention, if there is no local advertisement for unit of -dong when the search results are provided to the searcher, the local advertisement for unit of -gu to which its dong belongs, is displayed.

Also, since the advertisement effect may differ depending on the search item arranging method, the advertisement charge may be differently determined depending on the search item arranging method.

For another embodiment in determining the advertisement charge, the advertisement charge may be determined with consideration of frequency of page view or reference of the search item selected for the arrangement.

According to a preferred embodiment of the present invention, only at least a part of a search list among the identified search items is preferentially arranged according to the search item arranging method of the present invention, and the rest search items are arranged according to the arranging method independent of the above method. For the independent arranging methods, a number of references of the website of the network information provider related to the search item, usefulness of the information posted on the website, degree of perfection of the website, an order of the website's name, appraisal of a user, may be considered.

According to another embodiment of the present invention, it is possible to receive "network information" from the network information provider to register the information in the database even if there is no website of the network information provider, and to relate the registered network information to the search item. For the network information, there exist a trade name, a telephone number, a category, an address, map search information, business explanation, image information, a variety of additional information of the network information provider. If the local information of the network information provider is matched to the local information of the searcher each other upon search request by the searcher, it is possible to provide the network information to the searcher. Therefore, according to the present invention, it is possible to provide an advertisement opportunity through the local information search results, even to the small-scale network information provider who has no website in its region.

Figure 8:
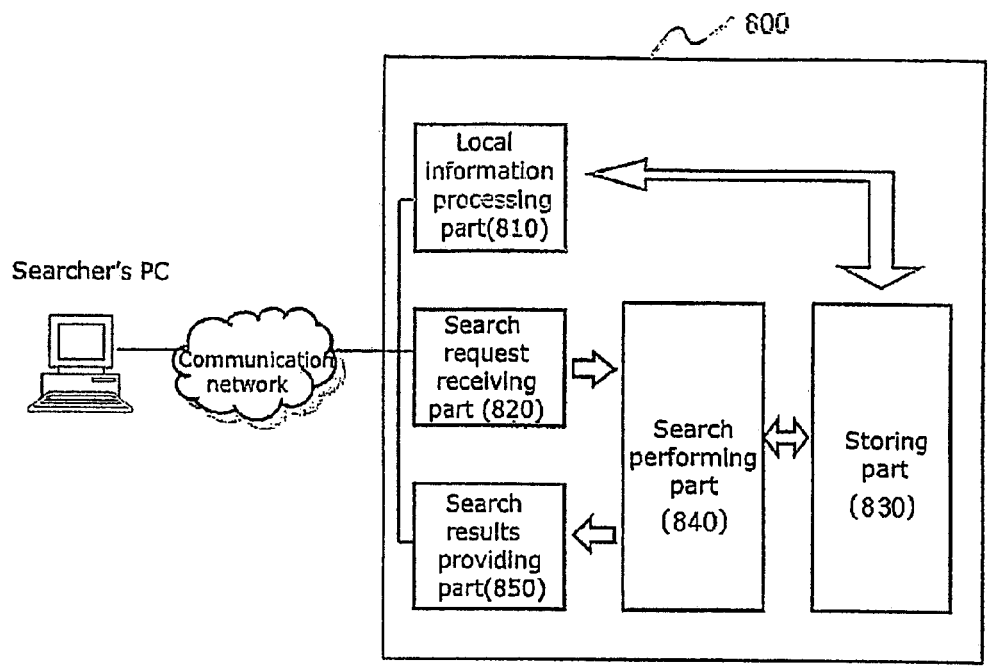
FIG. 8 is a block diagram showing an inner structure of the local information search results providing system according to the present invention.

FIG. 8 is a block diagram showing an inner structure of the local information search results providing system according to the present invention.

As shown in FIG. 8, the local information search results providing system 800 includes: a local information processing part 810; a search request receiving part 820; a storing part 830; a search performing part 840; and a search results providing part 850.

The local information processing part 810 receives the local information for searching from the searcher, and stores the received local information at the storing part 830. According to the embodiment of the present invention, the local information processing part 810 can provide a search configuration setting screen to the searcher in order to receive the local information for searching from the searcher, and the local information for searching received from the searcher can be stored as the search configuration setting information. For another embodiment, the cookie file stored at the searcher's terminal or the client program installed at the searcher's terminal may be used. As the details for the cookie file and the client program have been already described in the foregoing embodiments, refer to the relevant part of the specification.

The search request receiving part 820 receives a search request from the searcher. The search request receiving part 820 is connected to a searcher's PC through the communication network such as the Internet. According to the present invention, the searcher possibly carries out local information searching by only inputting a keyword without inputting the local information upon search request.

The storing part 830 includes a plurality of search items related to the network information provider. A plurality of the search items is related to the keyword and also related to the local information related to the network information provider.

The storing part 830 can directly receive the local information from the network information provider or extract the local information related to the network information provider from the web page of the network information provider and the configuration setting information and store the same as the local information.

The search performing part 840 identifies the search item related to the keyword that meets the search request in response to the search request received from the searcher, and also selects the search item related to the local information matched to the local information for searching, among the identified search items.

The search results providing part 850 arranges the search items selected by the search performing part 840 according to a predetermined search item arranging method. For the search item arranging method, there exist a keyword banner, knowledge search results, a sponsor link, a category, and a plus site.

Embodiments of the present invention further relate to computer readable media that include program instructions for performing various computer-implemented operations. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 9:
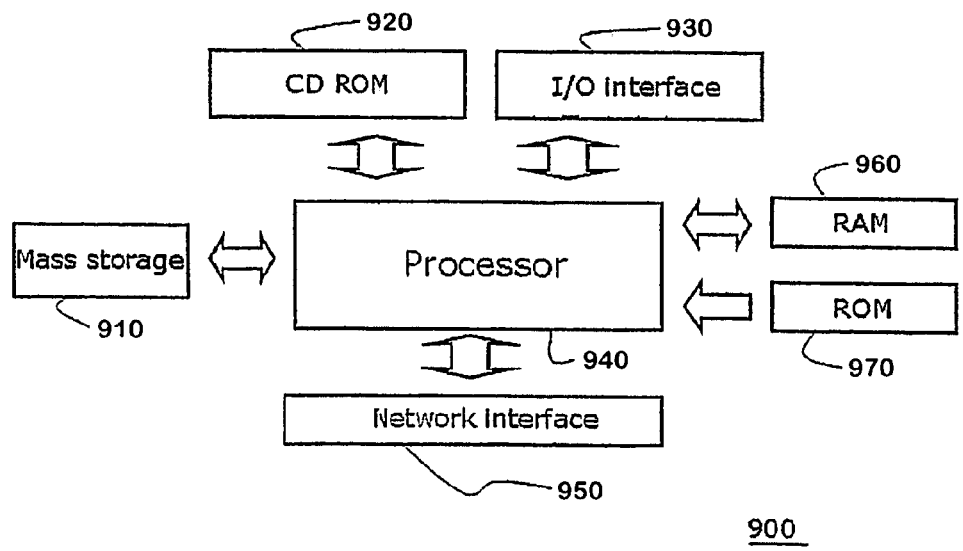
FIG. 9 is a block diagram illustrating a typical computer system in accordance with an embodiment of the present invention.

FIG. 9 is a block diagram illustrating a typical computer system in accordance with an embodiment of the present invention.

The computer system includes any number of processors 940 (also referred to as central processing units, or CPUs) that are coupled to storage devices including primary storage 960 (typically a random access memory, or "RAM"), primary storage 970 (typically a read only memory, or "ROM"). As is well known in the art, primary storage 960 acts to transfer data and instructions uni-directionally to the CPU and primary storage 960 is used typically to transfer data and instructions in a bi-directional manner. Both of these primary storage devices may include any suitable type of the computer-readable media described above. A mass storage device 910 is also coupled bi-directionally to CPU 940 and provides additional data storage capacity and may include any of the computer-readable media described above. The mass storage device 910 may be used to store programs, data and the like and is typically a secondary storage medium such as a hard disk that is slower than primary storage. A specific mass storage device such as a CD-ROM 920 may also pass data uni-directionally to the CPU. Processor 940 is also coupled to an interface 930 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 940 optionally may be coupled to a computer or telecommunications network using a network connection as shown generally at 950 With such a network connection, it is contemplated that the CPU might receive information from the network, or might output information to the network in the course of performing the above-described method steps. The above-described devices and materials will be familiar to those of skill in the computer hardware and software arts.

The hardware elements described above may be configured (usually temporarily) to act as one or more software modules for performing the operations of this invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

INDUSTRIAL APPLICABILITY

As described above, according to the present invention, the searcher can easily carry out searching of the local living information without repeatedly inputting the local information for searching.

According to the present invention, it is possible to arrange the local information search results in a variety of arranging methods selected by the network information provider.

According to the present invention, it is possible to provide effective advertisement marketing opportunities to the network information provider.

According to the present invention, it is possible to provide local search results that are fit for the characteristics of each region.

The invention claimed is:

1. A method for refining Internet search results in response to a search request input through a communication network by a searcher utilizing a keyword and a local information of the searcher, the method comprising the steps of:

receiving a first local information from the searcher comprising at least a location information of the searcher related to the searcher;

maintaining the first local information for searching related to the searcher;

receiving a second local information comprising at least a location information of one or more of search items related to a network information provider, wherein each search item corresponds to a web page on the Internet;

maintaining a database including the search items related to the network information provider, wherein some of the search items are related to the keyword of the searcher;

receiving the search request input through an Internet search engine by the searcher, the search request utilizing both the keyword and the maintained first local information related to the searcher;

identifying at least more than one search item related to the keyword that matches the search request, when the keyword that matches the search request is a local keyword, identifying search items related to the local keyword and selecting the search item related to the second local information matched to the first local information, among the identified search items; and arranging at least a part of the search items according to a predetermined search item arranging method in arranging the selected search items so as to provide Internet search results according to the first local information of the searcher, wherein the local keyword is differently selected depending on region with consideration of characteristics of the region.

2. The method according to claim 1, wherein the step of arranging at least a part of the search items according to the predetermined search item arranging method comprises the step of arranging the selected search item preferentially.

3. The method according to claim 1, wherein the step of arranging at least a part of the search items according to the predetermined search item arranging method, is to preferentially arrange the search item related to the second local information that is in agreement with the first local information and subsequently arrange the search item related to the second local information closely related to the first local information.

4. The method according to claim 1, wherein the step of maintaining the first local information for searching related to the searcher comprises the step of storing the first local information as search configuration setting information of the searcher, and the step of receiving the search request input through the Internet search engine by the searcher comprises the step of obtaining the first local information from the stored search configuration setting information.

5. The method according to claim 4, wherein the step of storing the first local information as the search configuration setting information of the searcher and the step of receiving the search request input through the Internet search engine by the searcher comprise a log-in procedure by the searcher.

6. The method according to claim 1, wherein the step of maintaining the first local information for searching related to the searcher comprises the step of storing the first local information in the form of a cookie file at a searcher's terminal, and the step of receiving the search request input through the Internet search engine by the searcher comprises the step of accessing to the cookie file and obtaining the first local information.

7. The method according to claim 1, wherein the step of maintaining the first local information for searching related to the searcher comprises the step of installing a client program at a searcher's terminal, and the step of receiving the search request input through the Internet search engine by the searcher comprises the step of receiving the first local information using the client program installed in the searcher's terminal.

8. The method according to claim 1, wherein the step of maintaining the database includes the step of receiving the second local information from the network information provider.

9. The method according to claim 1, wherein the step of maintaining the database includes the step of extracting the second local information from a website of the network information provider.

10. The method according to claim 1, wherein the step of maintaining the database includes the step of extracting the second local information from configuration setting information of the network information provider.

11. The method according to claim 10, wherein the step of extracting the second local information comprises the steps of:

maintaining a telephone exchange number and the second local information regarding the telephone exchange number, for a telephone number database;

obtaining information of the telephone exchange number, in which the configuration setting information includes the telephone exchange number of the network information provider; and identifying the second local information that is in agreement with information of the telephone exchange number of the network information provider with reference to the telephone number database.

12. The method according to claim 1, wherein the predetermined search item arranging method is one among a keyword banner, knowledge search results, a sponsor link, a category, and a plus site.

13. The method according to claim 1, wherein the step of maintaining the database includes the step of receiving network information from the network information provider to register the network information at a database, and relating the registered network information to a plurality of the search items.

14. A method for refining Internet search results in response to a search request input through a communication network by a searcher utilizing a keyword and a local information of the searcher, the method comprising the steps of:

receiving a first local information from the searcher comprising at least a location information for searching from the searcher and storing the received first local information for searching;

maintaining the first local information searching related to the searcher;

maintaining a second local information comprising at least a location information of one or more of search items for searching related to the searcher, wherein each search item corresponds to a web page on the Internet;

receiving a request for a local advertisement related to the second local information, from a network information provider;

maintaining a plurality of search items related to a keyword, in which the search items are related to the second local information in response to the request for the local advertisement;

receiving the search request input through an Internet Search engine the the searcher, the search request utilizing both the keyword and the maintained first local information related to the searcher;

identifying at least more than one search item related to the keyword that meets the search request, when the keyword that matches the search request is a local keyword, identifying search items related to the local keyword and selecting the second local information and search item related to the second local information matched to the first local information, among the identified search items; and arranging at least a part of the search items according to a predetermined search item arranging method in arranging the selected search items so as to provide Internet search results according to the first local information of the searcher, wherein the local keyword is differently selected depending on region with consideration of characteristics of the region.

15. The method according to claim 14, further comprising the steps of:

determining a predetermined advertisement charge for the local advertisement, wherein the advertisement charge is differently determined depending on the local information related to the local advertisement.

16. The method according to claim 14, further comprising the steps of:

determining a predetermined advertisement charge for the local advertisement, wherein the advertisement charge is determined with consideration of frequency of page view or reference of the selected search item.

17. A system for refining Internet search results in response to a search request input through a communication network by a searcher utilizing a keyword and a local information of a searcher, the system comprising:

a local information processing part for receiving the first local information for searching from the searcher and storing the first local information;

a search request receiving part for receiving the search request input through an Internet search engine by the searcher, the search request utilizing both the keyword and the maintained first local information related to the searcher;

a storing part for storing a plurality of search items related to a network information provider and relating the search item to a keyword and the second local information related to the network information provider, wherein each search item corresponds to a web page on the Internet;

a search performing part for identifying search item related to a keyword that meets the search request, when the keyword that matches the search request is a local keyword, identifying search items related to the local keyword and selecting a search item related to the second local information matched to the first local information, among the identified search items, in response to the search request, wherein the second local information matched to the first local information comprises both the second local information that is in agreement with the first local information and the second local information that is closely related to the first local information; and a search results providing part for arranging the selected search items according to a predetermined search item arranging method so as provide Internet search results according to the first local information of the searcher, wherein the local keyword is differently selected depending on region with consideration of characteristics of the region.

18. A computer-readable recording medium, in which a program for implementing a method according to claim 1 in a computer, is recorded.

19. The method according to claim 1, wherein the second local information that is closely related to the first local information comprises at least one of closely related location information, closely related cultural information, closely related social information, and closely related environmental information.

20. The method according to claim 14, wherein the second local information that is closely related to the first local information comprises at least one of closely related location information, closely related cultural information, closely related social information, and closely related environmental information.

21. The method according to claim 17, wherein the second local information that is closely related to the first local information comprises at least one of closely related location information, closely related cultural information, closely related social information, and closely related environmental information.

22. The method according to claim 1, wherein the second local information matched to the first local information comprises both the second local information that is in agreement with the first local information and the second local information that is closely related to the first local information.

* * * * *